No. 774,527. PATENTED NOV. 8, 1904.
G. W. MAXWELL.
INDEXED MECHANICAL DIRECTORY.
APPLICATION FILED JUNE 29, 1898. RENEWED AUG. 1, 1900.
NO MODEL. 2 SHEETS—SHEET 1.
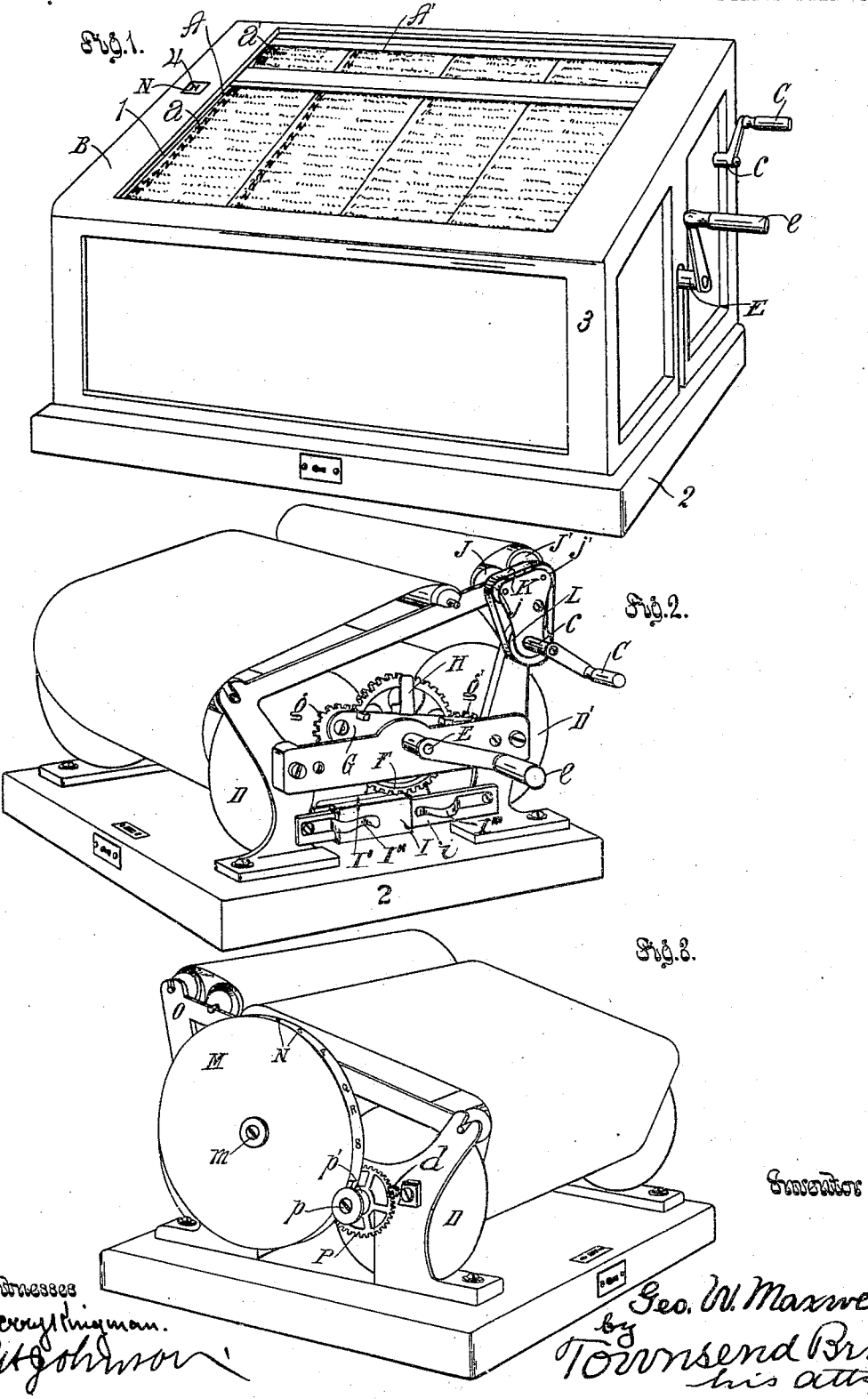

No. 774,527. PATENTED NOV. 8, 1904.
G. W. MAXWELL.
INDEXED MECHANICAL DIRECTORY.
APPLICATION FILED JUNE 29, 1898. RENEWED AUG. 1, 1900.
NO MODEL. 2 SHEETS—SHEET 2.
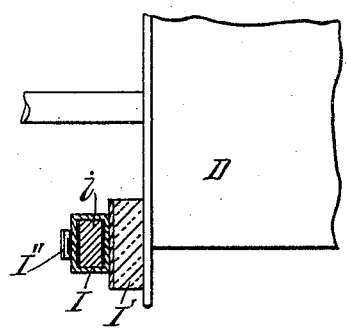
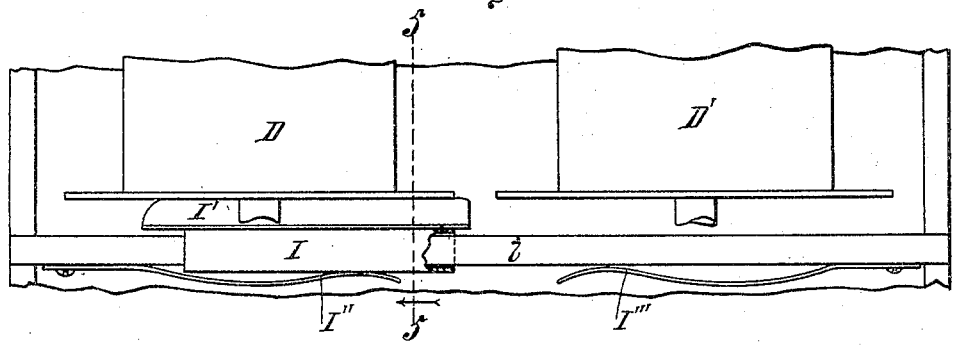

No. 774,527.                                            Patented November 8, 1904.

UNITED STATES PATENT OFFICE.

GEORGE W. MAXWELL, OF LOS ANGELES, CALIFORNIA.

INDEXED MECHANICAL DIRECTORY.

SPECIFICATION forming part of Letters Patent No. 774,527, dated November 8, 1904.

Application filed June 29, 1898. Renewed August 1, 1900. Serial No. 25,592. (No model.)

*To all whom it may concern:*

Be it known that I, GEORGE W. MAXWELL, a resident of Los Angeles, in the county of Los Angeles and State of California, have invented a new and useful Indexed Mechanical Directory; of which the following is a specification.

My invention relates to improvements in cabinet-directories for cities, &c., and is adapted for application with any suitable directory mechanism.

My invention relates more particularly to improvements in directories heretofore invented by me and for which I have made application for Letters Patent of the United States, and reference is more particularly made herein to the directory-operating mechanism which is shown in the accompanying drawings and is substantially the same as that which I have described and claimed in my application, Serial No. 676,132, filed in the United States Patent Office April 1, 1898, for a cabinet-directory. In said application I have shown two rollers, a directory-strip fastened to and rolled upon said rollers, a cog-wheel fastened to the axle of one of the rollers, a cog-wheel fastened to the axle of the other roller, a driving-shaft provided with a driving-gear, a master-wheel on the shaft and driven by the driving-gear, a lever journaled on the master-wheel shaft and provided at each end with a transmitting-pinion, said pinions meshing with and driven by said master-wheel and arranged to independently mesh with one and the other of the cog-wheels of the respective rollers when the lever is vibrated in the one or the other direction, and a friction device fixed to the lever and engaging the master-wheel to cause the rotation of the master-wheel to shift the lever to mesh one or the other transmitting-pinion with one or the other of the roller cog-wheels, thus to drive one of the rollers while releasing the other. In said application I also have shown, in combination with the rollers, a strip wound upon said rollers, means for alternately driving the one roller in one direction and at the same time releasing the other roller and for driving the other roller in the other direction and at the same time releasing the first roller, a rod extending parallel with the end faces of the rollers, a friction-block arranged to slide along the rod and to engage the end of one or the other of said rollers when shifted from one to another of said rollers and adapted to be slid along said rod by the friction of one of said rollers to contact with and produce friction upon the other of said rollers, thus forming a brake to prevent racing of the ribbon, and I have shown said mechanism in this application, but have not claimed the same herein, for the reason that the same is claimed in said other application.

In my present application I provide rollers of considerable length, having attached thereto a directory strip or ribbon of considerable width, upon which the names and addresses are arranged in alphabetical lists.

It is desirable in a ribbon directory of any considerable size that the ribbon move with great rapidity, so as to enable the user to turn from one end to the other of the ribbon, if desired, without loss of time.

The objects in view in my present application are, first, to provide for the rapidly-moving ribbon or directory-strip a slowly-moving index by means of which the user can readily determine at any and all times what list of names the rapidly-moving ribbon is presenting to view through the sight-opening of the directory-case; second, to permit the monthly or more or less frequent revision of the directory without the necessity of frequently reprinting the main directory strip or ribbon; and with this object in view I provide a supplemental directory mechanism comprising two rollers, a directory-strip fastened at its ends to the rollers, respectively, two pulleys, each being a part of or fixed to its respective one of said rollers, a driving-pulley with means for turning the same, and a band around said pulleys, so that the two rollers will be driven simultaneously in the same direction.

My present invention includes the several parts and combinations herein described and claimed.

The accompanying drawings illustrate my invention.

Figure 1 is a perspective view of my newly-invented cabinet-directory ready for use. Fig. 2 is a perspective view of the internal mechanism of the same as viewed from the same direction as that shown in Fig. 1. Fig. 3 is a perspective view of my invention viewed from the opposite end with case removed, as in Fig. 2. Fig. 4 is a fragmental plan detail to illustrate the brake appliance above referred to. Fig. 5 is a section on line 5 5, Fig. 4.

Referring to Fig. 1, which shows the directory complete, it will be observed that the names $a$ $a'$ of the main and supplemental directory-strips A A' are read through the glass top 1 of the case B. With the exception of the glass top 1 and the wooden bottom 2 the case is made of metal. The top of the case preferably projects inward or overhangs the interior of the case, and one side is perforated or provided with an opening 4. C is a small crank for turning the supplement or monthly list of changes and new information. The hole or opening 4 on the left of the top of the case is provided to expose the automatic index N. (Shown in Fig. 3.) The case B which I have shown is ten by eight inches at the base and six inches high and shows four columns of matter; but it is to be understood that my invention is applicable for any desired dimensions.

Referring to Fig. 2, in which I have shown exposed the directory mechanism for operating the rollers which carry the main directory-ribbon, the ribbon-operating mechanism is the same as that above specified as having been shown and claimed in my above-mentioned application for patent. D D' indicate the two ribbon-rollers which carry the main directory-strip A. E indicates the driving-shaft provided with a driving-gear (not shown) which drives the master-wheel F, which is journaled on the shaft E. G is a lever journaled on the master-wheel shaft and provided at each end with a transmitting-pinion, as $g$ $g'$, which pinions mesh with and are driven by the master-wheel and are arranged to independently mesh with the cog-wheels (not shown) of the respective rollers when the lever is vibrated in the one or the other direction. H indicates a friction device fixed to the lever and engaging the master-wheel to cause the rotation of the master-wheel to shift the lever to mesh a transmitting-pinion with one or the other of the roller cog-wheels, thus to drive one of the rollers and release the other. I indicates a tubular slide on a rod $i$, which is preferably square in cross-section. The tubular slide I carries a brake-shoe I', which engages the end or flange of either one of the rollers D D', to which it is applied, by shifting along the rod. The rod $i$ is arranged to cause the shoe I' to contact with the ends of the rollers near the periphery thereof, so that when the one roller rotates to wind the ribbon upon such roller the friction of such roller upon the shoe will cause the shoe to slide along the rod $i$ toward the other roller and will throw it into contact with the end of the other roller which is being rotated by the unwinding ribbon in the same direction in which the shoe is moving, so that the shoe is by friction automatically shifted from the winding-roller to the unwinding-roller to release the one and to prevent the racing of the other. I'' and I''' indicate springs to press upon the tube I to hold the shoe firmly against the rollers. The tube plays loosely upon the rod, so that the springs can always force the shoe into operative contact with the roller to be braked. The brake mechanism is not claimed in this application, for the reason that the same is claimed in said prior application for patent. J J' indicate the two small rollers for operating the monthly supplement-strip A'. These rollers are operated by a band K, which runs over the two rollers J J', or more properly over pulleys $j$ $j'$, which are fastened thereto and are virtually a part thereof. The band also runs around a wooden or other suitable friction wheel or pulley L, which is fastened to the crank-shaft $c$ of the crank C. In the machine which I have shown the diameter of the pulleys $j$ $j'$ is five-eighths of an inch and that of the friction wheel or pulley L is one inch; but it is to be understood that I am not limited to the dimensions stated.

Referring to Fig. 3, which shows the mechanism at the end of the directory opposite the end shown in Fig. 2, M indicates an index-wheel, upon the rim of which is placed the index for the list and comprises the letters of the alphabet from "A" to "Z," as indicated at N. The wheel M shown is about five inches in diameter and three-eighths of an inch in thickness and is fastened to the side of the frame O in which the pulleys of the directory are held. $m$ indicates a screw by which the wheel M is fastened to such frame and upon which screw the wheel M is journaled to revolve freely. It is to be understood that any form of journal may be used. The lower spool or roller D has a small pinion $d$ fastened to the end of the shaft of said roller and which meshes with a cog-wheel P, which is held in place by a screw $p$, which is fastened to the frame O, on which the cog-wheel P turns freely. $p'$ indicates a friction-roller fixed to the cog-wheel P and which is preferably covered with rubber. This contacts with and rotates the index-wheel M, upon which the letters of the alphabet are placed in order.

The letters of the alphabet are located on the index-wheel to correspond with the alphabetically-arranged lists as they appear on the ribbon or strip. The mechanism for driving the index-wheel will be geared to cause the index-wheel to make one revolution in the time during which the ribbon containing the directory will be wholly drawn across the sight-opening from "A" to "Z," or vice versa. The letters upon the index-wheel are arranged at distances apart proportionally to the spaces occupied by the lists under the corresponding letter in the main directory, so that the appropriate index-letter will appear at the index-opening to show to the user what list is visible at the sight-opening.

In practical operation the user will first turn the main crank e, thus to operate the main directory-ribbon, and will look into the sight-opening 4 until the initial letter of the name for which he is seeking will appear at such sight-opening, and he will then examine the list. Then in case the list of names having that initial is so large as to exceed the sight-opening he will turn the handle e more slowly until the place at which the name sought should appear will be brought to view. If he does not find the name at that place, he will then turn the crank C of the supplement, and thus bring to view the place on the supplement at which the name sought should appear.

The band K is tight enough upon the pulleys around which it passes to operate the rollers, but will allow sufficient slip to prevent tearing the paper by reason of the unequal winding as the thickness of ribbon increases upon one roller and decreases upon the other. Since the supplement will never be of any great extent, the accuracy of operation that is required in the main directory is not required in the supplement, and this simple arrangement is sufficient for the purposes of the supplement. The supplement can be revised each month or oftener, if required, at a very slight expense.

In this directory the names are arranged in alphabetical order or in alphabetical groups on both the main and supplementary ribbons, and it will be understood that the length of the groups, particularly on the main directory-ribbon, will vary considerably. It is therefore necessary to place the characters on the index-wheel at different distances, so as to correspond or conform to the groups on the main directory-ribbon, as stated. Moreover, in order to facilitate the use of the device it is desirable that the characters on the index-wheel should be parallel to the names on the ribbon and also that the movement of the index-wheel and of the ribbon should be parallel with one another, since with such arrangement the inspection may be much more rapid and certain.

The provision of the supplementary directory-ribbon is of especial advantage in connection with the index-wheel, as it enables correction of the main directory-ribbon without inserting names on the main ribbon. Said insertion of names would require a change in the index-wheel, which would be troublesome and expensive.

Now, having described my invention, what I claim as new, and desire to secure by Letters Patent, is—

1. In a mechanical directory, a casing, a ribbon provided with alphabetically-arranged names extending transversely to the ribbon, means in the casing for longitudinally moving said directory-ribbon, an index-wheel provided with characters arranged parallel to the names on the ribbon, and means for moving the wheel at a less peripheral speed than the movement of the ribbon.

2. In a mechanical directory, a casing, the top of which is provided with an opening, means in the casing for longitudinally moving a directory-ribbon, and an index-wheel, the periphery of which is provided with indicating characters and adapted to be moved so as to successively expose said characters through said opening and means actuated from the ribbon-actuating means for moving said index-wheel at relatively slow speed.

3. In a mechanical directory, a support, means therein for longitudinally moving a directory-ribbon, an index-wheel and a friction-roller loosely journaled on the side of the support and in peripheral engagement with each other, the roller being operatively connected with the ribbon-moving mechanism.

4. In a mechanical directory, a support, ribbon-spools journaled therein, the shaft of one of which is provided with a pinion, an index-wheel and a roller loosely mounted on the support in frictional contact with each other, the roller being provided with a gear-wheel in engagement with said pinion.

5. In a mechanical directory, a support, a directory-ribbon having names extending transversely thereon and arranged in groups longitudinally of the ribbon, means for longitudinally moving the ribbon on said support, a slot-moving index adjacent to said ribbon and provided with characters at different distances apart corresponding with the various spaces occupied by different groups of names on the ribbon, said characters being parallel with the names on the ribbon, and means for moving the index simultaneously with the ribbon.

6. In a mechanical directory, a base, standards thereon, the top of each of which is straight and extended at one end, two sets of rollers and two idlers journaled in said standards, one set of rollers being in the main portion and the other set being in the extension and the idlers being in the top below the extension, a directory-ribbon on each set of rollers, the intermediate portion of one of which passes over the idlers, said ribbons being simultaneously movable in the same direction, a removable casing on the base over the standards, the top of which casing is provided with a transparent portion over each set of rollers, and means extending to the exterior of the casing for operating each set of rollers.

GEO. W. MAXWELL.

Witnesses:
JAMES R. TOWNSEND,
SANDS W. FORMAN.